United States Patent
Wears (10) Patent No.: US 8,596,610 B2
(45) Date of Patent: Dec. 3, 2013

(54) UNIVERSAL TRIM CONTROL VALVE AND METHOD OF MAKING SUCH A CONTROL VALVE

(75) Inventor: William Everett Wears, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 451 days.

(21) Appl. No.: 12/495,062

(22) Filed: Jun. 30, 2009

(65) Prior Publication Data

US 2009/0320931 A1 Dec. 31, 2009

Related U.S. Application Data

(60) Provisional application No. 61/077,108, filed on Jun. 30, 2008.

(51) Int. Cl.
*F16K 1/42* (2006.01)

(52) U.S. Cl.
USPC ............................. 251/332; 251/363; 137/269

(58) Field of Classification Search
USPC .......... 137/269; 251/324, 360, 361, 362, 363, 251/332
See application file for complete search history.

(56) References Cited

U.S. PATENT DOCUMENTS

| | | | | |
|---|---|---|---|---|
| 1,763,486 A * | 6/1930 | Strong | ........................... | 251/360 |
| 1,970,726 A * | 8/1934 | Barrett | ........................... | 251/122 |
| 2,104,419 A * | 1/1938 | Frye | ............................... | 251/365 |
| 5,871,156 A * | 2/1999 | Lawson | ......................... | 239/201 |
| 6,186,413 B1 * | 2/2001 | Lawson | ......................... | 239/205 |
| 6,641,112 B2 * | 11/2003 | Antoff et al. | .................. | 251/363 |
| 6,698,449 B2 * | 3/2004 | Hall et al. | ................ | 137/315.41 |
| 6,789,784 B2 | 9/2004 | Wears et al. | | |
| 6,851,658 B2 | 2/2005 | Fitzgerald et al. | | |
| 6,974,121 B2 | 12/2005 | Koester et al. | | |
| 6,997,211 B2 | 2/2006 | Alman et al. | | |
| 7,028,712 B2 | 4/2006 | Wears et al. | | |
| 7,055,548 B2 | 6/2006 | Hamblin et al. | | |
| 2003/0062495 A1 * | 4/2003 | Long et al. | ..................... | 251/122 |
| 2004/0129915 A1 * | 7/2004 | Wears et al. | .................. | 251/360 |
| 2004/0239052 A1 | 12/2004 | Baumann | | |
| 2006/0207666 A1 | 9/2006 | Micheel et al. | | |

FOREIGN PATENT DOCUMENTS

WO  WO-2006/073678 A1  7/2006

OTHER PUBLICATIONS

Samson Series 3240 Technical Data Sheet dated Apr. 1996.
Flowserve Mark 100 Installation, Operation and Maintenance Instructions, 2004.
International Search Report for PCT/US2009/049226, mailed Oct. 12, 2009.
Written Opinion for PCT/US2009/049226, mailed Oct. 12, 2009.

* cited by examiner

*Primary Examiner* — William McCalister
(74) *Attorney, Agent, or Firm* — Marshall, Gerstein & Borun LLP (57) ABSTRACT

A universal control valve may use two different seat ring types including a threaded seat ring or a clamped seat ring. The valve includes a valve body, a cage mounting space enclosed by a bonnet and sized to receive two different valve cage types, and a seat ring mounting location including, an annular shoulder, a radiused projection, and a threaded portion. The threaded portion receives a threaded seat ring and the radiused projection forms a seal, while the shoulder supports a mounting flange of a clamped seat ring and forms a seal. Accordingly, the seat ring mounting location can receive a selected one of the two different seat ring types.

9 Claims, 7 Drawing Sheets

FIG. 7

UNIVERSAL TRIM CONTROL VALVE AND METHOD OF MAKING SUCH A CONTROL VALVE

FIELD OF THE DISCLOSURE

The disclosure relates to process control valves such as globe valves and, more particularly, to a universal trim valve that allows the same globe valve or globe valve body to receive either a threaded seat ring or a clamped seat ring.

BACKGROUND OF THE DISCLOSURE

Manufacturers typically design and assemble conventional globe style control valves to receive a specific type of seat ring, which may be a threaded seat ring or a clamped seat ring. These seat rings, which cooperate with a valve control element such as a valve plug to control fluid flow through the valve, are typically inserted into a cylindrical cavity formed within the valve body. The seat ring is usually separate from the balance of the valve body so that the seat ring can be replaced.

Each type of seat ring tends to have certain advantages and disadvantages. For example, clamped seat rings typically require a separate gasket beneath the seat ring in order to prevent or minimize fluid leakage. On the other hand, threaded seat rings may suffer certain alignment and seal problems, placing a higher premium on maintaining proper tolerances when machining the screw threads in the body and on the seat ring itself.

Because the construction and method of attachment of threaded seat rings and clamped seat rings differ significantly from one another, manufacturers design and construct the valve body to accept only the selected seat ring type. The differences in the two types of valve bodies necessarily prevent one type of valve body from receiving the other type of seat ring. These fundamental differences in the construction of the valve bodies require manufacturers to maintain extra production lines, and require distributors to maintain an inventory of valve bodies for threaded seat rings and valve bodies for clamped seat rings.

SUMMARY OF THE DISCLOSURE

A globe valve assembly includes a valve body having a fluid inlet, a fluid outlet and a passageway connecting the fluid inlet and the fluid outlet. A movable valve plug is disposed in the passageway. The movable valve plug in combination with valve trim and a valve seat disposed in the passageway control and characterize fluid flow through the valve assembly. The valve seat is mounted to the valve body at a valve seat mounting location. The valve seat mounting location includes a first shoulder, a second shoulder and a threaded portion. The first and second shoulders being positioned between the threaded portion and the valve trim. The mounting location is adapted to receive either a threaded seat ring or a clamped seat ring.

While the disclosure is susceptible to various modifications and alternative constructions, certain illustrative embodiments of the universal trim have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the disclosure as defined by the appended claims.

DETAILED DESCRIPTION

For purposes of the following discussion, terms such as inwardly, outwardly, radially inwardly or radially outwardly are used to indicate relative position with respect to a center axis A of a valve stem. Similarly, terms such as upper, lower, upwardly, or downwardly are used to indicate relative orientation when the control valve is positioned as shown in the drawings.

Figure 1:
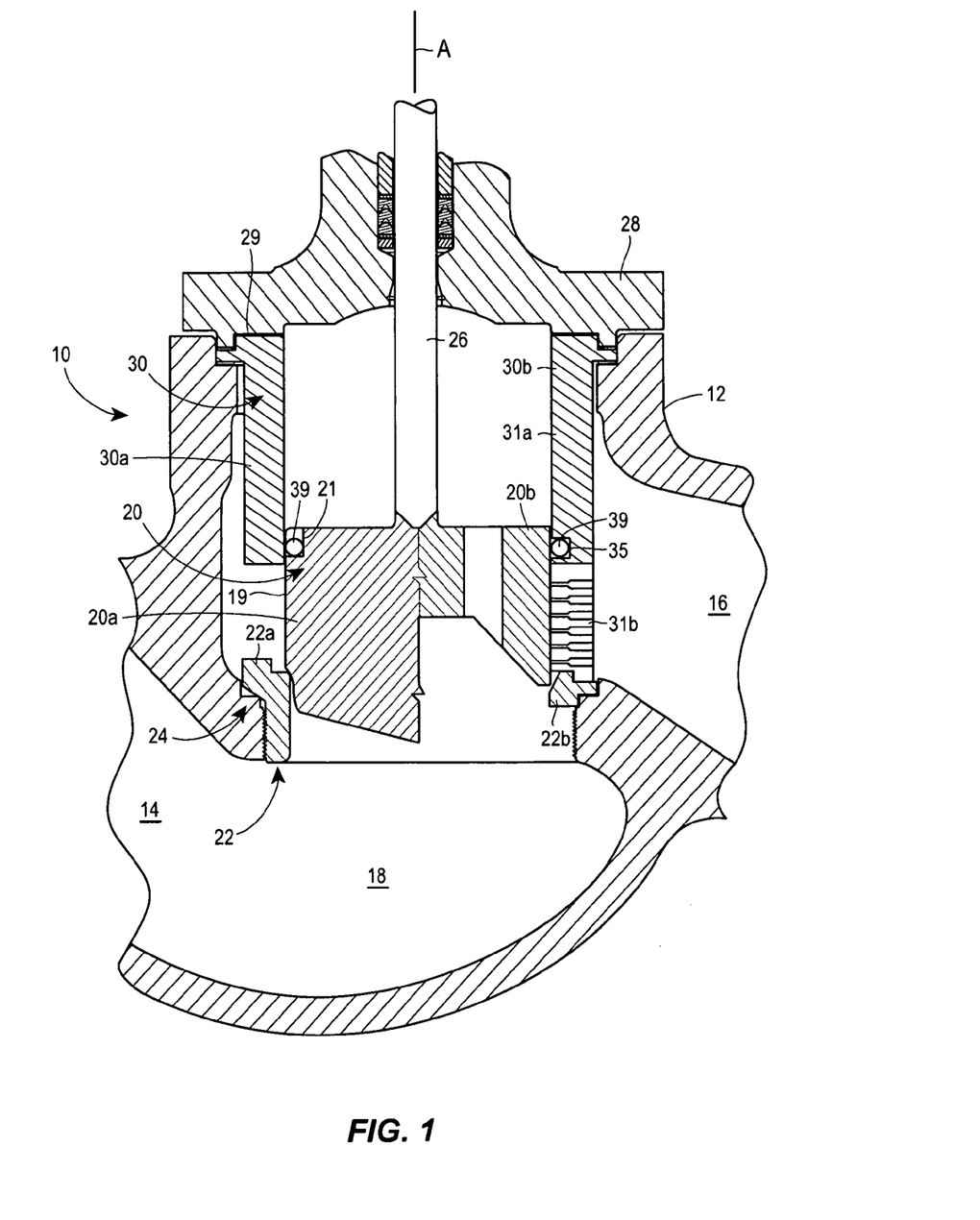
FIG. 1 is a cross-sectional view of a globe valve constructed in accordance with the teachings of the disclosure showing a threaded seat ring on the left side of FIG. 1 and a clamped seat ring on the right side of FIG. 1.

Referring now to the drawings, FIG. 1 illustrates a universal control valve 10 assembled in accordance with the teachings of the disclosed example of the present invention and having a valve body 12, a fluid inlet 14, a fluid outlet 16, and a passageway 18 connecting the fluid inlet 14 and the fluid outlet 16. In the example shown, the universal control valve 10 is a globe valve. However, the teachings of this disclosure may be applied to other types of control valves as well. A valve plug 20, which may be either a first valve plug type 20a or a second valve plug type 20b, is movably mounted within the valve body 12 and shiftable between a closed position (as shown in FIG. 1), or an open position (not shown). The left side of FIG. 1 illustrates the first valve plug type 20a as an unbalanced plug, while the right side of FIG. 1 illustrates the second valve plug type 20b as a balanced plug. The valve 10 includes a seat ring 22, which may be either a threaded seat ring 22a (shown on the left side of FIG. 1) or a clamped seat ring 22b (shown on the right side of FIG. 1). The first and second valve plug types may be interchanged. For example, the unbalanced valve plug 20a (left side) may be used in cooperation with the clamped seat ring 22b (right side) and vice versa. As is shown in FIG. 1, the valve body 12 can accommodate either the threaded seat ring 22a or the clamped seat ring 22b at a seat ring mounting location 24. The valve also includes a valve stem 26 coupled to the valve plug 20 and extending through a bonnet 28. The valve stem 26 extends along an axis A and is connected to a valve actuator (not shown) for moving the valve plug 20 between the closed position shown in which the valve plug 20 is in contact with the seat ring 22, thereby preventing fluid flow through the passageway 18 and an open position in which the valve plug 20 is spaced away from the seat ring 22, thereby allowing fluid to flow through the passageway 18.

An interior of the valve body 12 forms a valve cage mounting space 29 which is sized to receive a valve cage 30. The valve cage 30 may be one of at least two possible valve cage types, including a first valve cage type 30a (shown on the left side of FIG. 1), or a second valve cage type 30b (shown on the right side of FIG. 1). In the example shown, the first valve cage type 30a is in the form of a hung single-piece cage, while the second valve cage type 30b is in the form of a two-piece clamped cage. As shown on the left side of FIG. 1, an outer portion 19 of the plug 20a may include a channel 21, the channel 21 being sized to receive a seal 39, such as an omni-seal.

Referring to the right side of FIG. 1, the clamped cage type 30b typically includes an upper part 31a and a lower part 31b. The cage 30b includes a channel 35 formed on an inner wall 37, and the channel 35 is sized to receive the seal 39, which again may be an omni-seal.

The cage mounting space 29 is sized to receive the single-piece cage type 30a shown on the left side of FIG. 1, with an upper portion of the cage type 30a secured between the bonnet 28 and the valve body 12. Similarly, the cage mounting space 29 is sized to receive the cage type 30b shown on the right side of FIG. 1, again with an upper portion of the cage type 30b secure between the bonnet 28 and the valve body 12. A lower portion of the cage tape 30b presses against the clamped seat ring 22b. In the event the cage type 30b is a two-piece cage, the cage parts 31a and 31b may be formed of materials having different coefficients of thermal expansion so that a constant or relatively constant pressure may be maintained on gaskets and/or seals in the valve, regardless of a temperature of fluid flowing through the control valve 10.

Figure 2:
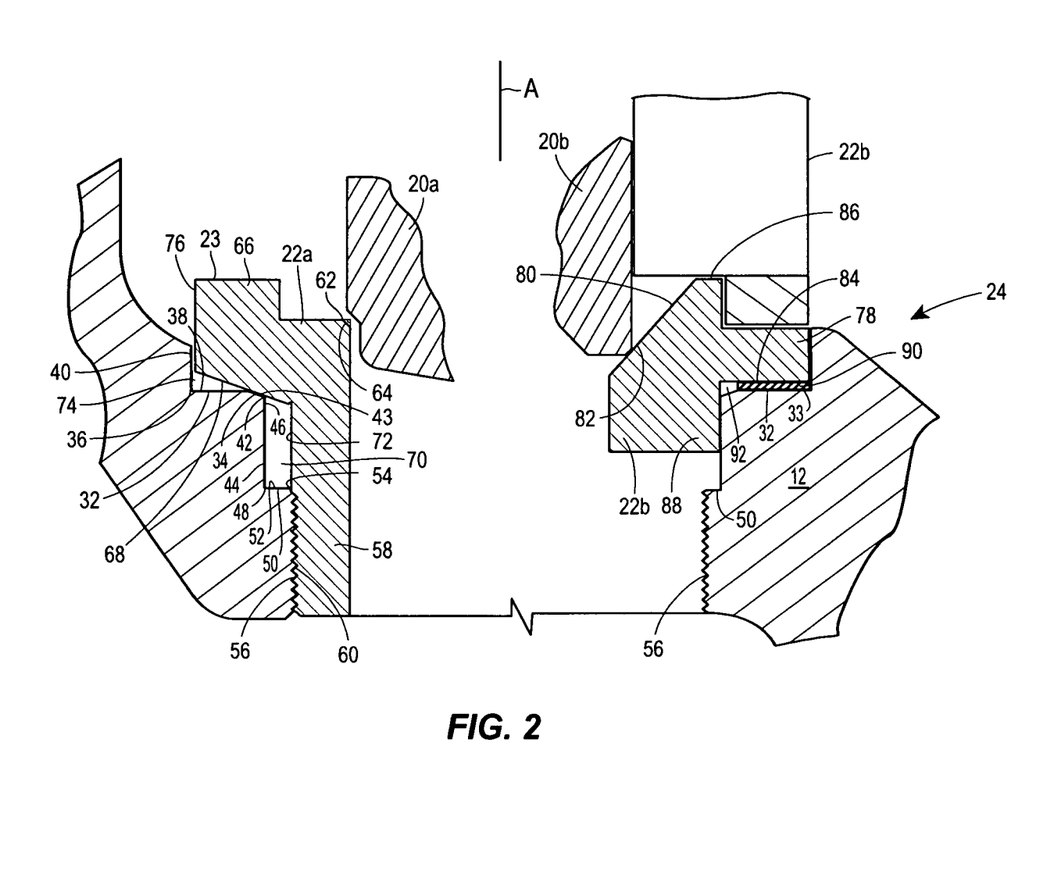
FIG. 2 is an enlarged fragmentary cross-sectional view of the seat ring mounting location, illustrating the threaded seat ring disposed in the seat ring mounting location on the left side of the drawing, and illustrating the clamped seat ring disposed in the seat ring mounting location on the right side of the drawing.

Referring now to FIG. 2, the seat ring mounting location 24 is shown in greater detail. The seat ring mounting location 24 is formed around a generally round orifice or opening formed in the valve body 12 along the passageway 18. The seat ring mounting location 24 includes an annular first shoulder 32 including an inner portion 34, and outer portion 36, and having a generally flat upwardly facing surface 38. The outer portion 36 of the first shoulder 32 terminates at a surrounding inner wall 40 of the valve body 12. The inner portion 34 of the first shoulder 32 terminates at or transitions into an annular projection 42. In the example shown, the projection 42 is radiused.

In the example shown, the projection 42 is disposed radially inwardly relative to the first shoulder 32. An annular wall 44 is formed below the projection 42, and includes an upper portion 46 that transitions into the projection 42, and a lower portion 48 that transitions into an annular second shoulder 50. The second shoulder 50 includes a generally flat upwardly facing surface 52, and an inward end 54 that transitions into a threaded portion 56. In the example shown, the first shoulder 32 is disposed above the second shoulder 50, and the projection 42 is disposed radially inwardly relative to the first shoulder 32 and radially outwardly relative to the second shoulder 50. In the disclosed example, the first shoulder 32 is wider than the second shoulder 50, and both shoulders 32 and 50 are generally flat or planar. As will be explained in greater detail below, the projection 42 forms an annular sealing surface 43 with the seat ring 22a when the seat ring 22a is mounted in the seat ring mounting location 24. Similarly, the first shoulder 32 forms an annular seating surface 33 with the seat ring 22b when the seat ring 22b is mounted in the seat ring mounting location 24.

Figure 3:
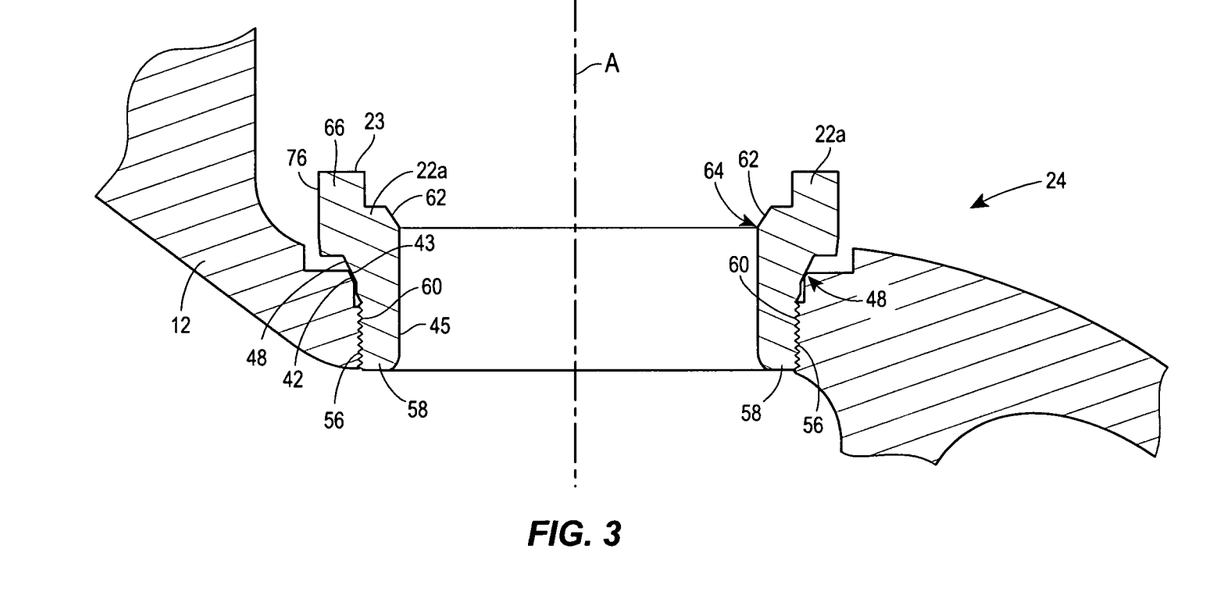
FIG. 3 is a close up cross-sectional view of a threaded seat ring of the globe valve as shown on the left side of FIG. 1.

Referring now to the left side of FIG. 2 and to FIG. 3, a lower portion 58 of the seat ring 22a includes an annular threaded portion 60 which is sized to engage the threaded portion 56 of the seat ring mounting location 24 to enable the seat ring 22a to be mounted to the valve body 12 at the seat ring mounting location 24. An inner portion 62 of the seat ring 22a forms an annular thrust-bearing rim which defines an annular valve seat 64 which is sized to engage the valve plug 20a (partially visible on the left side of FIG. 2) to form a seal when the valve plug 20a is in the closed position. An outer portion 66 of a seat ring 22a includes a downwardly facing surface 68 which abuts the projection 42 to form the annular sealing surface 43. In accordance with the disclosed example, the surface 68 is angled or sloped. In the example of FIG. 2, a gap 70 is formed between the annular wall 44 and a first outer wall 72 of the seat ring 22a, and a gap 74 is formed between the surrounding wall 40 and a second outer wall 76 of the seat ring 22a.

The seat ring 22a may include a lug 23 which may provide a leverage point that may be used to torque the seat ring 22a into position during insertion and removal of the seat ring 22a. Alternatively, a tool may interface with the lug 23 to provide additional leverage during insertion and removal of the seat ring 22a. In the disclosed example, the angled or sloping surface 68 and the projection 42 cooperate to form a seal between the seat ring 22a and the valve body 12. Additionally, in the disclosed example, the surface 68 guides the seat ring 22a into position during insertion of the seat ring 22a into the seat ring mounting location 24.

Referring now to the right side of FIG. 2, the seat ring 22b includes a mounting flange 78 which, in the disclosed example, extends in a radially outward direction. An upper portion 80 of the seat ring 22b forms an annular valve seat 82 which is sized to engage the valve plug 20b to prevent fluid flow when the valve plug 20b is in the closed position. In accordance with the disclosed example, the upper portion 80 is sloped. The mounting flange 78 includes a downwardly facing surface 84 that is sized to extend over the first shoulder 32 such that, in the disclosed example, the first shoulder 32 supports the mounting flange 78 and hence the seat ring 22b. In accordance with the disclosed example, the mounting flange 78 extends perpendicular relative to axis A, such that the surface 84 is generally flat or planar. An upper portion 86 of the seat ring 22b abuts the second valve cage 22b. In the disclosed example, the seat ring 22b includes a downwardly depending portion 88 which may or may not make contact with or rest on the second shoulder 50. A seal or gasket 90 is sized to be received in a gap 92 between the mounting flange 78 and the first shoulder 32 in order to provide a seal between the valve body 12 and a seat ring 22b.

Figure 4:
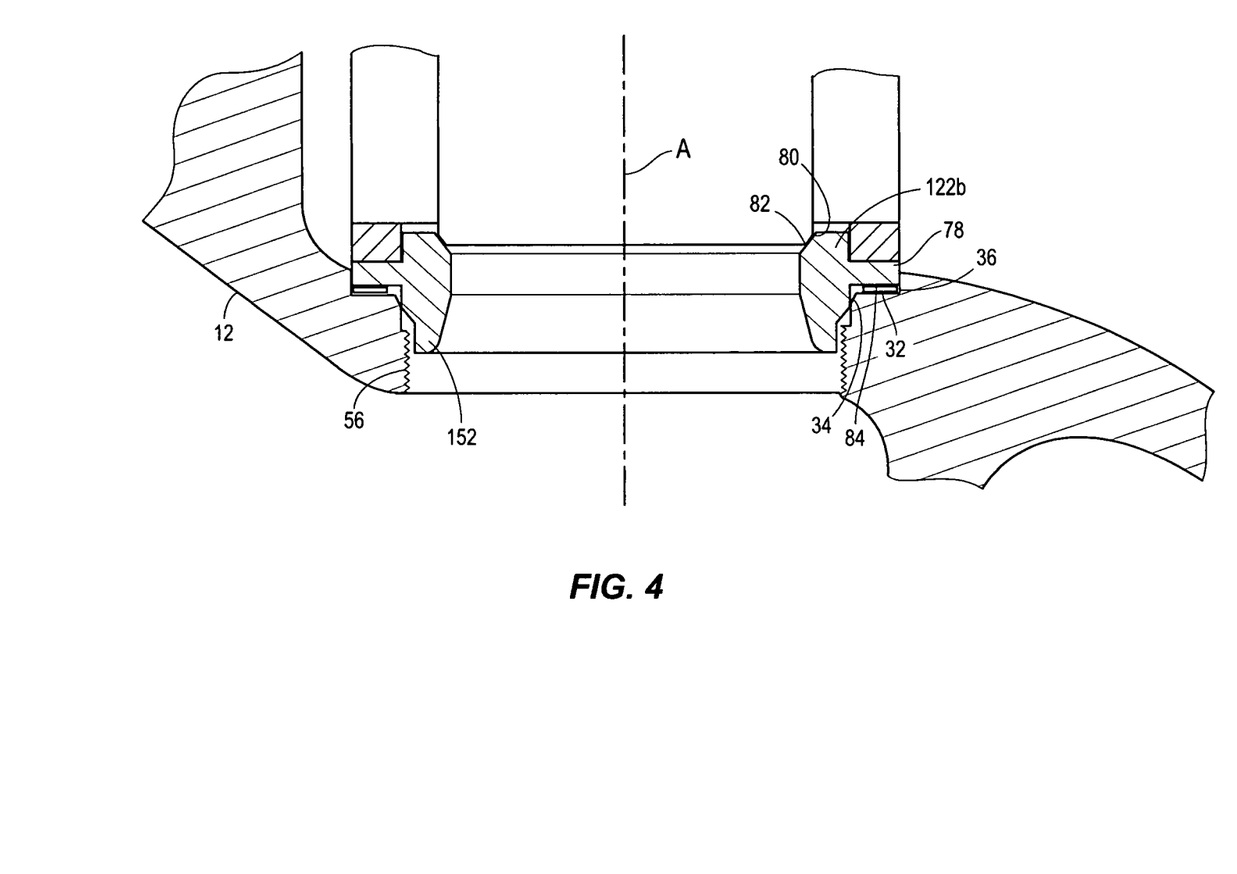
FIG. 4 is a close up cross-sectional view of the clamped seat ring of the globe valve as shown on the right side of FIG. 1.

Referring now to FIG. 4, another embodiment of a clamped seat ring is shown and is referred to by the reference number 122b. The seat ring 122b may be substantially similar to the seat ring 22b discussed above, but the seat ring 122b includes an overhang portion 152 that is separated or otherwise spaced apart from the adjacent threaded portion 56 of the valve body 12. Consequently, the overhang portion 152 overlies at least some of the threaded portion 56 of the valve body 12 and, in accordance with the disclosed example, the overhang portion 152 shelters and protects at least part of the threaded portion 56 from impingement wear due to fluid flow through the valve 10. As a result, the threaded portion 56 remains substantially undisturbed and in good condition, such that threaded portion 56 may receive the threaded seat ring 22a if desired upon removal of the clamped seat ring 122b. In all other respects, the seat ring 122b may be substantially similar to the seat ring 22b discussed above with regard to FIG. 2.

Figure 5:
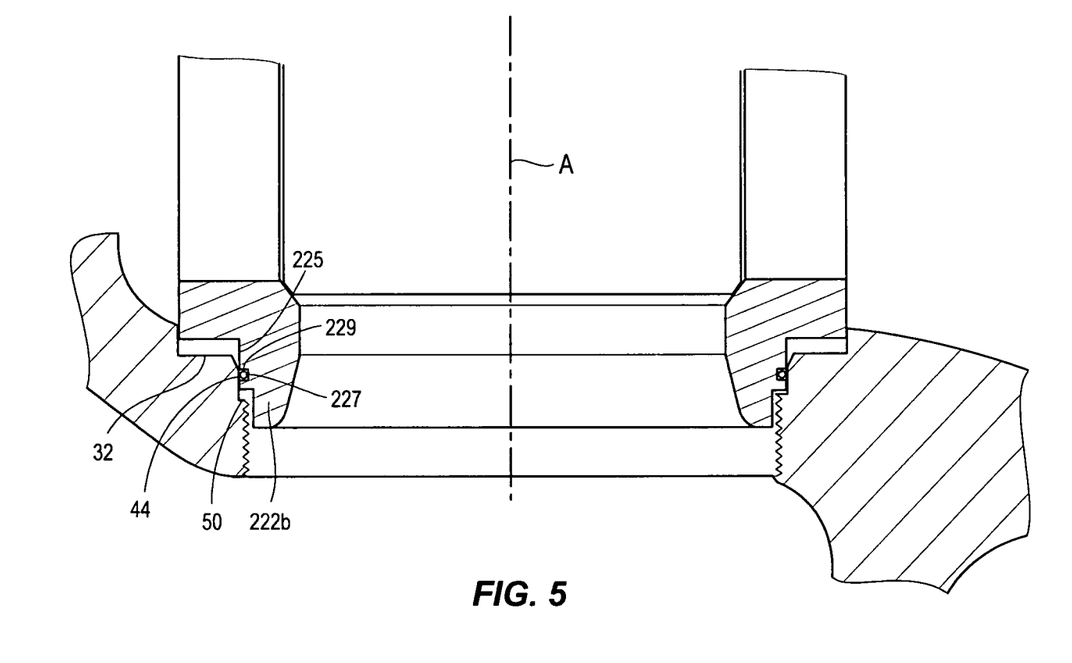
FIG. 5 is a close up cross-sectional view of an alternate hung cage with interface seal.

Referring now to FIG. 5, another embodiment of a hung cage is shown and is referred to by the reference numeral 222b. In the embodiment shown, an outer wall 225 of the seat ring 222b includes a channel 227, and a seal 229 is provided which fits within the channel 227. The seal 229 abuts the annular wall 44 to form a seal between the annular wall 44 and the seat ring 222b. In all other respects, the clamped seat ring 222b may be the same or similar to the clamped seat rings discussed above with respect to the earlier-disclosed embodiments. It will be understood that the relative dimensions of the first and second shoulders 32, 50 may be adjusted as needed in order to mate with the relevant surfaces of the selected seat ring, or to otherwise receive the specific shape of the seat ring.

Figure 6:
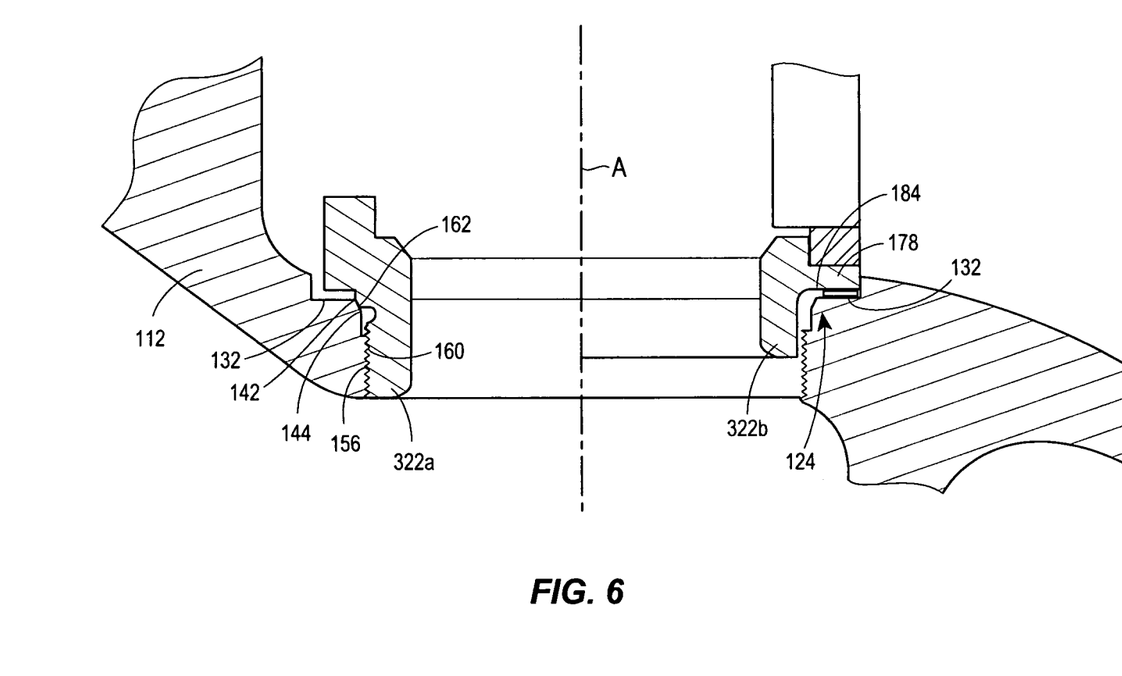
FIG. 6 is a close up cross-sectional view of an alternate embodiment of a threaded seat ring on the left side of FIG. 6 and an alternate embodiment of a clamped seat ring on the right side of FIG. 6.

Referring now to FIG. 6, another embodiment for a seat ring mounting location is shown and is generally referred to by the reference 124. In the embodiment shown, seat ring mounting location 124 has been changed slightly relative to the above described seat ring mounting location to substantially eliminate the second shoulder 50. Consequently, the seat ring mounting location 124 includes a shoulder 132, a projection 142, and a sloping surface 144. Again, the projection 142 may be radiused. The sloping surface 144 transitions into a threaded portion 156.

As shown on the left side of FIG. 6, a threaded seat ring 322a is shown and includes a threaded portion 160 sized to engage the threaded portion 156. The seat ring 322a includes a corner or projection 162 which engages the sloping surface 144 to form a seal. In all other respects, the seat ring 322a may be similar to one or more of the threaded seat rings discussed above.

Referring now to the right side of FIG. 6, a clamped seat ring 322b is shown and includes an outward mounting flange 178 having a lower surface 184. The mounting flange 178 is sized such that it may be supported on the shoulder 132, although preferably the components are sized to permit placement of a gasket or seal between the mounting flange 178 and shoulder 132. In all other respects, the seat ring 322b may be similar to one or more of the clamped seat rings discussed above.

Figure 7:
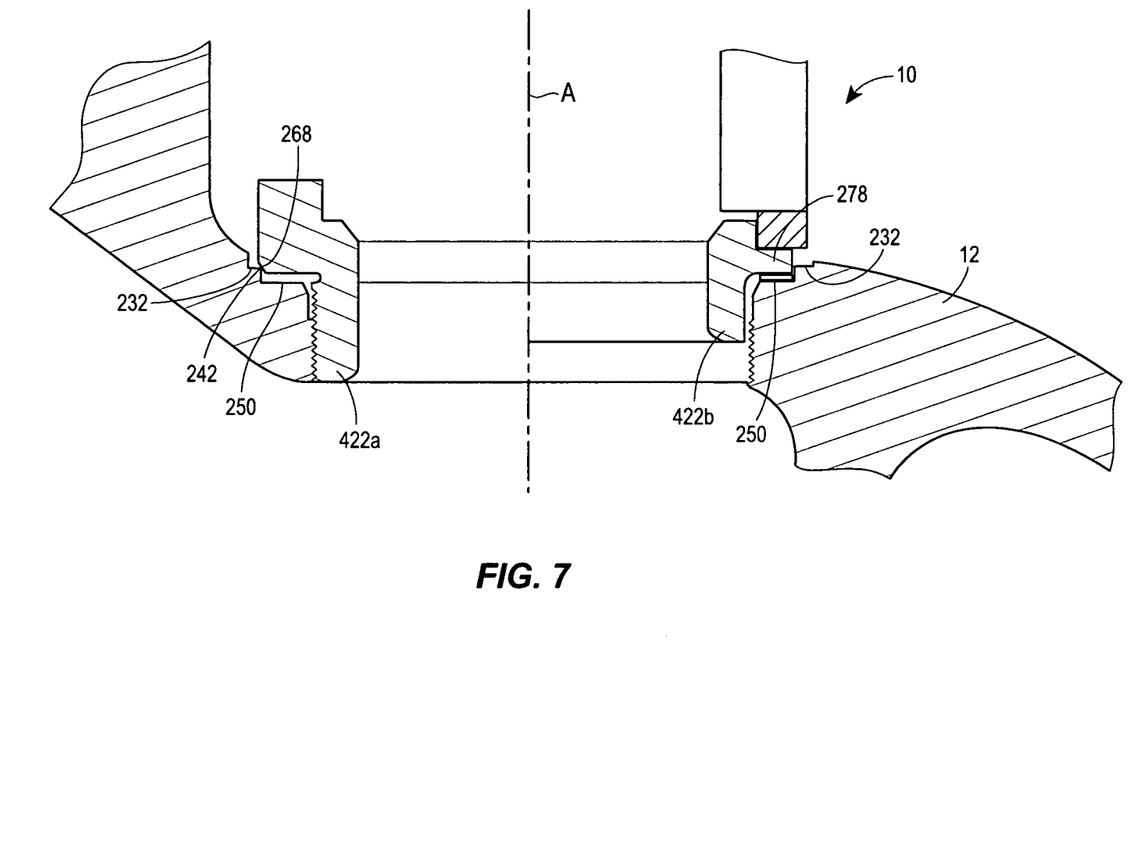
FIG. 7 is a close up cross-sectional view of another alternate embodiment of a threaded seat ring on the left side of FIG. 7 and another alternate embodiment of a clamped seat ring on the right side of FIG. 7.

Referring now to FIG. 7, another embodiment of a threaded seat ring 422a is shown on the left side of the drawing, while another embodiment of a clamped seat ring 422b is shown on the right side of the drawing. Once again, it will be understood that the relative dimensions of the first and second shoulders 232 and 250 may be adjusted as needed in order to mate with the relevant surfaces of the selected seat ring, or to otherwise receive the specific shape of the selected seat ring. In the embodiments shown, the first shoulder 232 is narrower than the second shoulder 250, such that the projection 242 is disposed further radially outward relative to the embodiments discussed above. The seat ring 422a includes a sloping surface 268 which is positioned to abut the projection 242 to form a seal. As shown on the right side of the drawing, a mounting flange 278 of the seat ring 422b rests on the second shoulder 250. In this case, the second shoulder 250 supports the mounting flange 278 and is disposed radially inwardly relative to the first shoulder 232. Again, a gasket or seal may be provided, and those of skill in the art will understand that the relative dimensions of the shoulders as well as the seat rings may be adjusted as needed in order to mate with the necessary surfaces.

In accordance with one or more of the disclosed examples, a universal control valve system is provided that allows the user to select one of at least two different valve trims using the same valve body 12. By constructing a valve body 12 in accordance with the teachings of one or more of the above-disclosed examples, a user may assemble the valve 10 with the valve plug 20a in conjunction with any one of the above-mentioned threaded seat rings and the complementary valve cage type, or with the valve plug 20b in conjunction with any one of the above-mentioned clamped seat rings and the complementary valve cage type. Moreover, the user may assemble the valve 10 with one type of valve trim, and later disassemble the valve and reassemble the valve for the other type of valve trim. When assembling the valve 10, the user merely decides which valve trim is desired, and then the user selects the appropriate valve cage type, the appropriate valve plug, in the appropriate seat ring.

The foregoing detailed description has been given for clearness of understanding only and no unnecessary limitations should be understood therefrom, as modifications will be obvious to those skilled in the art.

The invention claimed is:

1. A universal control valve comprising:
   a valve body having an inlet and an outlet fluidly connected through a passageway;
   a valve plug movably mounted in the valve body;
   a cage mounting space defined within the valve body and enclosed by a bonnet disposed on the valve body, the cage mounting space arranged to receive two different valve cage types including a first valve cage type and a second valve cage type; and
   a seat ring mounting location defined within the valve body and disposed in the passageway, the seat ring mounting location including:
      an annular first shoulder that extends inwardly from a surrounding inner wall of the valve body, the annular first shoulder terminating at the inner wall of the valve body, the annular first shoulder including a planar upward facing surface that is perpendicular to an axis of movement of the valve plug;
      an annular projection disposed radially inwardly of the first shoulder; and
      a threaded portion;
   a first seat ring, the first seat ring including an outer portion having a downwardly facing surface that is angled and non-parallel to the annular first shoulder and an annular threaded portion; and
   a second seat ring, the second seat ring including a mounting flange extending radially outward, away from an upper portion,
   wherein the annular projection forms a seal by cooperating with the downwardly facing angled surface of the first seat ring when the first seat ring is fully inserted into the seat ring mounting location; and
   wherein the annular first shoulder supports the mounting flange of the second seat ring when the second seat ring is fully inserted into the seat ring mounting location, the annular first shoulder being positioned to abut the mounting flange.

2. The universal control valve of claim 1, wherein the seat ring location includes an annular second shoulder disposed radially inward of the annular first shoulder, the annular second shoulder being parallel to the annular first shoulder.

3. The universal control valve of claim 2, wherein the annular second shoulder is disposed above the threaded portion and radially outward of the threaded portion.

4. The universal control valve of claim 3, wherein the annular second shoulder has a width that is less than a width of the annular first shoulder.

5. The universal control valve of claim 1, wherein the annular first shoulder is disposed radially outward relative to the annular projection.

6. The universal control valve of claim 1, wherein the first seat ring further comprises a lug extending upward, away from the downwardly facing angled surface to an elevation above an annular thrust bearing rim that defines a valve seat configured to engage the valve plug, the lug being located radially outward of the annular projection.

7. The universal control valve of claim 1, wherein a gap is formed between an outer wall of the first seat ring and the surrounding inner wall of the valve body when the first seat ring is inserted into the seat ring mounting location.

8. The universal control valve of claim 1, wherein the upper portion of the second seat ring is sloped.

9. The universal control valve of claim 1, further comprising a gasket that is sized to be received in a gap between the mounting flange and the annular first shoulder when the second seat ring is fully inserted into the seat ring mounting location.

\* \* \* \* \*